United States Patent [19]

Call et al.

[11] Patent Number: 5,450,383
[45] Date of Patent: Sep. 12, 1995

[54] MONITORING AND ADJUSTING LASER WRITE POWER IN AN OPTICAL DISK RECORDER USING PULSE-WIDTH MODULATED POWER LEVEL CHECKING SIGNALS

[75] Inventors: David E. Call, Holister, Calif.; Blair I. Finkelstein; Glen A. Jaquette, both of Tucson, Ariz.

[73] Assignee: International Business Machines Corporation, Armonk, N.Y.

[21] Appl. No.: 372,466

[22] Filed: Jan. 13, 1995

Related U.S. Application Data

[63] Continuation of Ser. No. 249,771, May 26, 1994, abandoned.

[51] Int. Cl.⁶ ............................................. G11B 7/00
[52] U.S. Cl. .................................... 369/116; 369/54; 369/58; 369/100
[58] Field of Search ................... 369/54, 58, 116, 100, 369/106

[56] References Cited

U.S. PATENT DOCUMENTS

| | | | |
|---|---|---|---|
| 4,631,713 | 12/1986 | Romeas et al. | 369/54 |
| 5,067,122 | 11/1991 | McGee | 369/116 |
| 5,136,569 | 8/1992 | Fennema et al. | 369/58 |
| 5,185,733 | 2/1993 | Finkelstein et al. | 369/54 |
| 5,216,659 | 6/1993 | Call et al. | 369/116 |
| 5,226,027 | 7/1993 | Bakx | 369/58 |
| 5,305,297 | 4/1994 | Nishiuchi | 369/116 |
| 5,341,360 | 8/1994 | Johann | 369/116 |
| 5,410,527 | 4/1995 | Ashinuma | 369/116 X |

*Primary Examiner*—David C. Nelms
*Assistant Examiner*—Son Mai
*Attorney, Agent, or Firm*—Dan Shifrin

[57] ABSTRACT

A write-once optical disk data recorder automatically calibrates a laser during a write data operation and using write pulses focussed to a disk. First, the laser is calibrated using a non-focussed laser beam. Each sector of the disk has a laser checking or test area, such as an automatic laser power correction field (ALPC) of two byte lineal extent. During a first write operation after a power up or disk load, a pulse width modulated (PWM) laser test signal is recorded using a laser power level set using the non-focussed laser beam and an indicated desired recording power level on the disk. The recorded laser test signal is read back. The length of the read back laser test signal is measured. The measured length is then compared with a desired length of the PWM laser test signal that indicates a desired laser power level. That is, as laser recording power levels increase, a resultant recorded signal grows in size. This property is used to measure laser power for calibrating laser operation.

15 Claims, 3 Drawing Sheets

DAC—DIGITAL-TO-ANALOG CONVERTER

ALPC—AUTOMATIC LASER POWER CALIBRATION

MONITORING AND ADJUSTING LASER WRITE POWER IN AN OPTICAL DISK RECORDER USING PULSE-WIDTH MODULATED POWER LEVEL CHECKING SIGNALS

RELATED APPLICATION

This application is a continuation of Ser. No. 08/249,771, filed May 5, 1994, now abandoned.

DOCUMENT INCORPORATED BY REFERENCE

Call et al U.S. Pat. No. 5,185,734.

FIELD OF THE INVENTION

This invention relates to write-once read-many (WORM) optical disk storage devices, more particularly to controlling the laser used to write data on a WORM disk.

BACKGROUND OF THE INVENTION

Write-once read-many (WORM) optical media have stamped indications of manufacturer selected laser power level for recording or writing data unto the respective media. It is a current common practice to read and use the indicated laser power level for recording on such write once media. Usually, optical disk laser controls use feedback for accurately controlling laser emission levels. As such, laser calibration upon loading a disk medium is avoided.

Because of variability between optical media, media aging and laser control circuit aging, media contamination, actual emitted laser beam power for optimum recording may be different from laser drive current settings based upon such media-indicated laser beam power level. The above-mentioned aging may vary the operation of the circuits and media response resulting in either a laser over-power level or laser under-power level situation. Such over-power laser beam levels can over ablate a track so as to obliterate adjacent recorded data, destroy a groove that interferes with tracking following and seeking, and the like. Such under-power levels may result in defective recording, such as recording over previously recorded data. Therefore, it is desired to calibrate laser power level in a write-once media recorder to avoid such under or over power laser beam levels.

In prior-art laser-beam level calibration for write-once disks used defocussed beams for avoiding ablating usable data storage space of the disk. Such out-of-focus calibration may result in a laser beam power level that is different than the calibrated laser beam level. That is, the laser beam power level for a given laser drive current changes as the beam is focused. This phenomena is caused by a shift in the differential efficiency of a semiconductor laser used in optical recording as the laser beam spot on an optical disk becomes focussed. This shift occurs because of light reflected from the disk into the laser cavity creating a cavity external to the laser. This shift in laser differential efficiency not only varies from laser to laser but also is affected by the efficiency of the optical feedback path. The path variability is caused by media variations and by contamination of the optical path (objective lens). Therefore, it is desired to calibrate and control laser beam power level in a write-once recorder using an in-focus beam and in a manner that data-storage space is not used. Further, in write-once media systems, it is not effective to use the media data-storing areas for calibrating a laser, such as is reasonable in rewriteable optical disks (usually magnetooptical). It is therefore also desired to calibrate a laser beam power level in an in-focus condition without using data fields of disk sectors that would reduce the data-storage capacity of the disk.

In many write-once optical disks, a two-byte automatic laser power correction (ALPC) field is provided in each write-once disk sector. This ALPC field enables correcting laser power for writing data at a correct or desired emitted laser power level. The ALPC field also enables the laser to be operated at write level outside of the data area. Such writing of a laser test signal in the ALPC field is monitored for ensuring that the laser is emitting a proper level laser beam to the disk. Such measurement is made with a photo detector receiving either the using so-called wasted light from a beam splitter or using light from an auxiliary port of the laser. This write testing merely turns the laser continuously on at write level for a period of time equal to scanning one or two bytes on the disk. Such an extended-time continuous write signal can have excessive energy resulting in so-called over ablation, i.e. the area ablated (physical size of the recorded laser test signal) exceeds the track width and may exceed the length of the ALPC field. Remember that such laser power level verification is measured at the output of the laser and does not measure ablation on an optical disk.

A reason for this over ablation is the duty cycle is different from a usual write pulse. That is, a usual write pulse has a duty factor of about 10% that ablates about one-half of the track width. In contrast, the 100% duty cycle used in the write qualification is extreme to often ablate radially outside of the track being written to. Such over ablation not only extends radially but also circumferentially (at the trailing edge of the DC pulse). While the duration of a recorded laser test signal need not fill the ALPC 2-byte field, many recorders do record such a laser test signal. In the latter instance, excessive laser power level results in a recorded laser test signal that crowds or extends to an ensuing write area, such as a sync area that precedes recorded user data. Recorded laser test signals having a shorter length may still radially over ablate in the ALPC area. Therefore, such extended continuous laser emissions may have undesired heating of the laser and its immediate environs. It is desired to avoid such over ablation.

The so-called correct write power level is also dependent on the duration or width of a laser write pulse. Writing in write-once media often assumes that the recorded write power level on each disk is correct. Because of circuit variations, signal delay tolerances of ±5%, signal propagation asymmetries in various circuits, and the like results in variations of actual recorded write pulses of a same power level that is non-linear. It is desired to avoid such unintended variations of write-once recording.

DISCUSSION OF THE PRIOR ART

Romeas et al in U.S. Pat. No. 4,631,713 show recording binary test words on a write-once optical disk having a 10 repeated pattern. The durations of the respective "1" and "0" portions of the test pattern are measured. The laser write power that results in equality of the durations of the 1 and 0 portions are equal is selected as the recording value. This calibration requires using valuable disk space that is desired to be avoided.

McGee in U.S. Pat. No. 5,067,122 shows a system for measuring monitor sensitivity in an optical recording system. The test includes measuring a rate of change of the monitor response to a given test write signal for deriving a desired write laser power. Again, it is desired to avoid using write-once disk space for such calibration.

Bletscher, Jr et al in U.S. Pat. No. 5,070,495 show an extensive calibration system based on symmetry parameters. This calibration requires excessive data storage space. While practical for rewriteable media, it is not economical for write-once media.

Fennema et al in U.S. Pat. No. 5,136,569 show a write calibration based upon the type of medium is sensed. If a rewriteable medium is sensed, then extensive calibration of the laser, such as discussed above, is employed. If a write-once(WORM) medium is detected, then limited calibration is performed. This patent illustrates the need for conserving disk space in write-once media. It is desired to provide for an extended laser calibration technique that does not use data-storing areas.

Finkelstein et al in U.S. Pat. No. 5,185,733 show another extensive laser calibration using randomly selected tracks. This method and apparatus are appropriate to rewriteable media only. The calibration results in selecting a write laser power level that results in a maximum read back signal amplitude.

Call et al in U.S. Pat. No. 5,216,659 show a laser power calibration by measuring laser drive current in an out-of-focus beam condition at the surface of a WORM medium and in an in-focus condition of the laser beam. A slope is generated representing variations in laser beam power level versus laser current that enables calculations of laser power based on laser current.

Bakx in U.S. Pat. No. 5,226,027 shows obtaining an optimum parameter for a disk that influences recording quality. Testing and auxiliary pattern areas are required. Also, a series of calibration areas are required. It is desired to reduce the disk area requirements for calibration from that required by Bakx.

SUMMARY OF THE INVENTION

In a preferred form of the invention, a laser-test signal is recorded in the same sector as data but before data are recorded, such as in a ALPC field. If the recorded laser-test signal is detected as having a width different from an established pulse length, then the laser write pulse power level is adjusted in a direction to produce a previously established length laser-test signal. Data are recorded after the adjustment in a predetermined number of sectors. Then, the recorded laser-test signals in those sectors are measured to determine their recorded lengths. The measured lengths are averaged to produce an averaged measured length value. The averaged width is then compared with the established width. If the average measured length is not proper, the adjustment is repeated until an averaged measured length matches the desired length. Such adjustments are performed as a part of usual write operations. Data from the sectors written by a laser pulse creating an improper width write pulse-generated PWM signal may be reassigned to other sectors.

The present invention also enables calibrating laser operations in a write-once optical disk player by measuring a width (duration) of a write pulse-generated pulse-width-modulated (PWM) laser-test signal. The write pulse-generated PWM signal is generated by a pulsed laser beam that provides for overlapping of recorded pulse signals along a track being scanned. Such write pulse-generated PWM signal is preferably recorded in an automatic laser pulse correction (ALPC) field of the sector.

The foregoing and other objects, features and advantages of the invention will be apparent from the following more particular description of preferred embodiments of the invention, as illustrated in the accompanying drawings.

DETAILED DESCRIPTION

Figure 1:
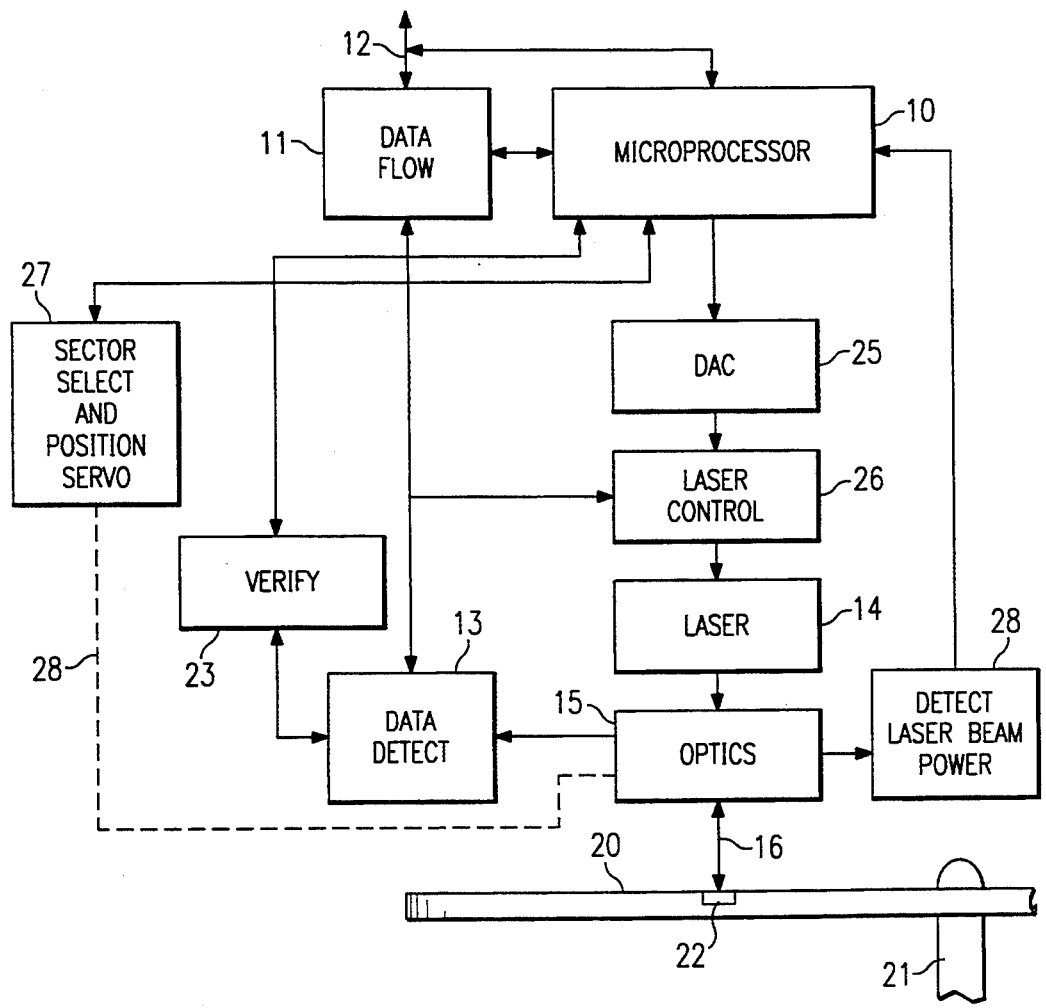
FIG. 1 illustrates, in a simplified block diagram form, an optical disk recorder in which the invention is advantageously employed.

Referring now more particularly to the appended drawing, like numerals indicate like parts and structural features in the various figures. Referring first to FIG. 1, microprocessor 10 operates and controls the illustrated optical disk recorder. The usual internal memories (random access memory RAM and read only memory ROM) are included in microprocessor 10. The usual data flow circuits 11 connect to a host processor (not shown) over attachment cable 12. Data detect circuits 13 respond to modulated reflected light from optical disk 20 via the usual optics to detect data and format-indicating signals. The detected data signals travel directly to data flow circuits 11 for error detection and correction processing. Data flow 11 supplies indications of the detected format signals to microprocessor 10 for enabling it to control the recorder. Laser 14 supplies a data-modulated laser beam through optics 15, thence over bi-directional optical path 16 to track 22 (represented as being in a groove) of optical disk 20. A usual motor (not shown) on drive spindle 21 rotates disk 20 for enabling the beam on path 16 to scan tracks on disk 20. Optics 15 are relatively radially movable with respect to disk 20 for accessing a single spiral track at different radii.

Microprocessor 10 controls laser 14 via digital to analog converter (DAC) 25 and laser control 26. DAC 25 sets laser power levels for writing and reading. Data modulation of the laser 14 laser beam is controlled by data flow circuits 11, all under control of microprocessor 10. Verify circuit 23 received read back signals from data detect 13 to compare with data received from the attaching host processor via data flow 11. Verify circuit 23 supplies the results of the comparison to microprocessor 10. If the comparison shows an identity (error correctable identity that is corrected by less correction power than is available by an error correction code being used for data correction) of read back data with data to be recorded, then verification of recording is given, otherwise verify circuit 23 supplies a verify failure signal to microprocessor 10. Power level detect circuits 28 receive so-called wasted light from a beam splitter (not separately shown) in optics 15 for indicating to microprocessor 10 emitted laser light power level (intensity). Microprocessor 10 includes a program that controls laser 14 to emit a laser beam having one of several predetermined power levels via digital inputs to DAC 25, as is known. The diverse power levels respectively are gated by data to be recorded on disk 20.

As usual, optics 15 is mounted on a carriage, represented by dashed line 28, that relatively moves optics 15 radially of disk 20 for accessing each one of the track 22 rotations on disk 20. Sector select and positioning servo 27 moves the carriage 28 radially of disk 20 and also selects (addresses) which of the addressable sectors in track 22 are to be accessed for either reading or writing. Since such arrangements are well known, further detail is dispensed with.

Figure 2:
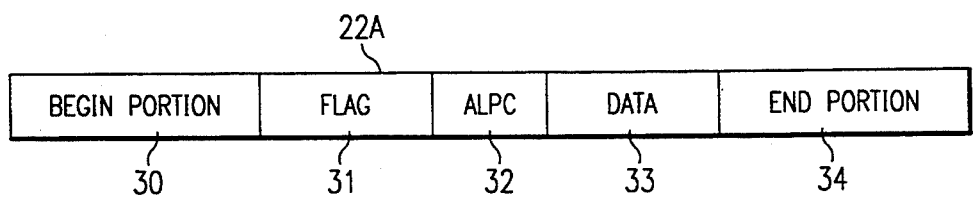
FIG. 2 diagrammatically illustrates a format of a sector of a disk used in the FIG. 1 illustrated optical disk recorder.

FIG. 2 diagrammatically shows, in a simplified form, the format used for each one of multiple addressable sectors in track 22, a single spiral track on disk 20. Begin portion 30 includes the usual clock synchronizing signals plus identification signals for the sector. In one embodiment, begin portion 30 starts with a usual sector mark (not shown—none of the internal details of begin portion 30 are shown in the drawing), then a first clock synchronization burst termed VFO1 (variable frequency oscillator burst type one) followed by a usual first address mark (AM). A first sector address identification ID1 follows the first AM. Then a second clock synchronization burst VF02, second address mark AM and second sector identification ID2 follow. A third repetition of the clock sync, AM and ID3 cluster follows. Other usual control fields were also used. A gap, represented by the vertical line between begin portion 30 and flag field 31 separates portion 30 from flag field 31. A similar gap separates flag field 31 from two-byte ALPC field 32.

The present invention uses ALPC field 32 in a new and novel manner. ALPC field 32 circumferentially abuts data field 33. Data field 33 starts with a fourth clock synchronization burst termed VFO3 followed by a usual data-bit synchronization (sync) signal then recorded data. The internal details of data field 33 are not shown in the drawing. End portion 34 includes usual error detecting correcting redundancies, such as cyclic redundancy check signals and error correcting signals, as is known. A gap, not shown, separates adjacent sectors, i.e. between end portion 34 of one sector and begin portion 30 of a next adjacent sector.

Figure 3:
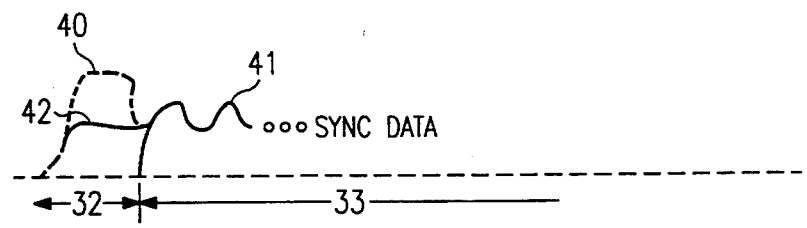
FIG. 3 graphically illustrates an effect of practicing the present invention on read back signals of the FIG. 1 illustrated optical disk recorder.

FIG. 3 illustrates the signal interference effects of prior art laser power recorded signal 40 in ALPC 32 with respect to the data clock synchronization burst VFO3, indicated by numeral 41. Laser 14 beam power is measured by power detect 28 while the laser is emitting a constant write intensity beam to the ALPC field 32. Note that the emitted beam power indicates a write pulse having a predetermined power for a predetermined period of time (empirically determined). Laser 14 emitted constant high intensity (DC) laser power test beam over ablates ALPC 32 resulting in a trailing edge of recorded laser test signal 40 circumferentially extending to data field 33. As a result, a negative effect on the read back circuits (not separately shown) in data detect 13 can cause errors in delayed clock synchronization because of the high amplitude DC laser test signal 40. According to one aspect of this invention, a close string of write pulses are recorded in ALPC 32 resulting in recorded write-pulse PWM laser test signal 42 that does not extend to data field 33 nor produces a high amplitude DC read back signal. The resultant reduced amplitude and less encroachment toward data field 33 provides faster and more reliable clock synchronization in data field 33.

Another negative effect of over-ablated test signal 41 is the erosion of the groove radially. This erosion can cause missing counting the track groove during a track seek. This count error results in the track seeking to an unintended spiral track circumvolution rather than to the target circumvolution. The present invention obviates this additional risk.

Figure 4:
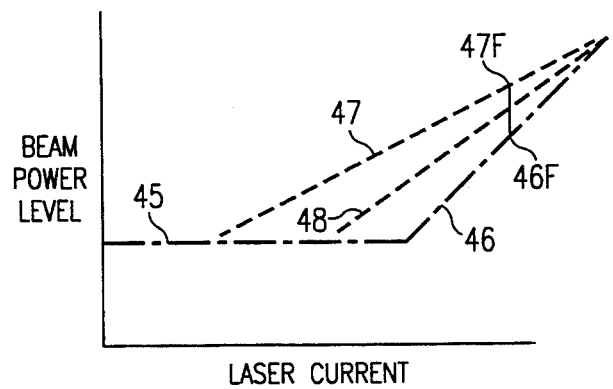
FIG. 4 graphically illustrates relationships between laser drive current and laser beam power in different focus conditions.

It is also desired to measure laser beam power level while the laser 14 emitted beam is focussed on the recording layer of disk 20 (groove 22). It is usual practice to measure laser beam power while the laser beam is defocussed so as not to ablate disk 20 write-once recording surface. According to this invention, the ALPC fields 32 in the various sectors are used for adjusting laser beam power as a result of performing a data recording or write operation, while the beam is focussed for writing and without using any data storing sectors nor accessing a sector separately from a write operation. FIG. 4 graphically illustrates a relationship of laser beam power at the recording surface with respect to laser current in focussed and defocussed states. Horizontal line 45 indicates minimum lasing power for laser 14. Line 46 indicates the change in beam power level with laser current in an out of focus condition. This line represents operation of the laser when focussing using an out-of-focus beam. Line 48 indicates in-focus beam using 1% feedback. Line 47 indicates in-focus beam using 2% feedback. Point 46F indicates a possible calibration of laser 14 emitted beam power level in an out-of-focus calibration. Point 47F indicates the resultant in-focus beam power level using 2% feedback. This graph shows that if a laser is power calibrated for writing using an out-of-focus beam, then the in-focus write laser power level is greater than if calibration used an in-focus laser beam. Such increased write beam power level can result in over-ablative writing as discussed above for the APLC test. Therefore, it is important to calibrate a laser write power level when the beam is in focus.

Figure 5:
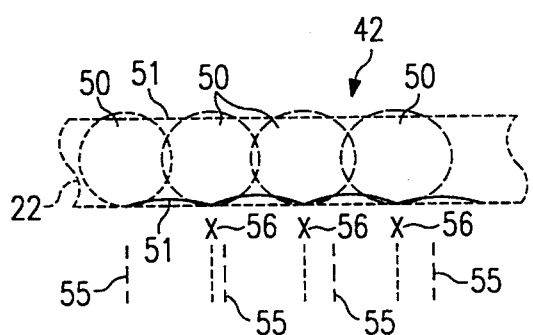
FIG. 5 diagrammatically illustrates a write pulse-generated PWM signal recorded in a write-once track of an optical medium as generated by the FIG. 1 illustrated optical disk recorder.

FIG. 5 diagrammatically shows a recorded write pulse-generated PWM laser test signal 42. Again note that the laser beam power level is measured by power detect 28 using wasted light from optics 15 during the time ALPC field 32 test signal is being written. A portion of track 22 is indicated by the two horizontal dashed lines. Numeral 50 indicates a series of write intensity laser beam recorded "dots" that overlap longitudinal of track 22 that is a write-pulse-generated PWM laser test signal. The recorded "dots" are about the radial width of track 22 (dots 50 can be smaller in diameter and still be used to practice the present invention). The resultant recording, because of thermal effects, creates a write-pulse-generated PWM laser test signal 42 indicated by wavy lines 51. Usually, the recorded write-pulse-generated PWM signal when sensed results in a read back signal envelope that has a minor modulation component. This write pulse-generated PWM signal results in signal 42 of FIG. 3. An advantage to the write-pulse-generated laser test signal is that the test signal replicates use of a data recording operation as opposed to the extended time DC maximum peak signal of the prior art.

The FIG. 5 illustrated PWM signal is generated using the known write control by microprocessor 10 of laser 14 via DAC 25 and laser control 26. Data flow 11 supplies write-clock timed pulses to a laser control 26 to gate the DAC 25 laser level to laser 14. The timed pulses are generated by a usual write clock (oscillator, not shown) in data flow 11. As usual, the write clock emits a timed pulse once each bit period, i.e. defines a bit period. Either a binary one signal or a binary zero signal is "recorded" in each bit period. A binary zero signal is no ablation in track 22 while a binary one signal is an ablation (also termed a "pit"). The bit periods are selected to ensure that the recorded 1's do not overlap, either by duration of the bit period or by coding that avoids two one's from being recorded in adjacent bit periods. If a (2,7) code, for example, is used, then no adjacent bit periods each have a one signal. In this instance, to create the PWM signal 42, the (2,7) code is ignored by recording a binary one in each of a succession of bit periods. In such recording, the recorded binary ones result in overlapping ablations as seen in FIG. 5. It is to be noted, that the circumferential length of such ablated pits vary with radius when using a constant duration bit period. On the other hand, a recording system may employ timed write pulses that result in spaced apart ablated pits, such as represented in FIG. 5 by hash marks 55 that respectively indicate successive bit period centers. Successive recorded one signals then will not create a PWM signal. As an example, a (2,7) data pattern of 1001001001 (each 1 indicates a pulse to be recorded) can be used to produce recorded dots 50 that do not overlap, i.e. are separated along the length of track 22 as represented by numerals 55. Changing a (2,7) code data pattern to 101010101 results in the recorded dots 50 to overlap to produce the PWM signal 42. Such recording controls are preferably programmed controlled by microprocessor 10. Such program control may include a DAC set by microprocessor 10 to select a bit period to be used in recording. The DAC 25 (not shown) outputs an analog frequency (bit period) control signal to bias a VFO (not shown) in a known manner to oscillate for producing timing pulses having a selected period.

Figure 6:
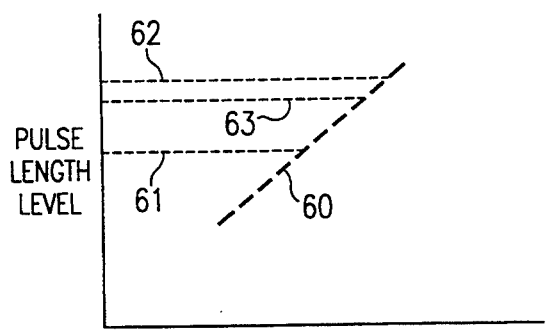
FIG. 6 graphically illustrates a relationship between pulse widths and laser beam power as used in the FIG. 1 illustrated apparatus.

In accordance with another aspect of the present invention, the actual laser 14 write-intensity beam power level at the surface of disk 20 is measured by measuring the length of a recorded write-pulse-generated PWM laser test signal 42 (FIG. 3). FIG. 6 illustrates the linear variation (within the operating range of write recording beam power levels (intensities) of pulse length with changing laser beam power level. Line 60 illustrates the linear change in pulse duration (length) as beam power level changes. Line 61 indicates a 10% low power level. Line 63 indicates optimal write-beam power level for recording. Line 62 indicates a peak power level greater than optimal for desired recording. Because the higher peak values rise and fall in the same time duration as lower power pulses, the effective length of the recorded pulses are longer, as best understood with respect to FIG. 7.

Figure 7:
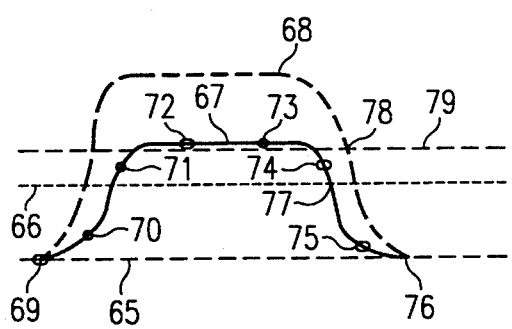
FIG. 7 graphically illustrates measurement of the length of a laser test signal.

Read back laser test signal (pulse) 68 of FIG. 7 illustrates a PWM pulse generated at the optimal power level. The shape of read back PWM pulse 67 is determined by measuring amplitudes at a sequence of points, such as indicated by numerals 69–76. Points 72 and 73 together measure the amplitude of PWM read-back pulse 67. Measurement points 70 and 71 combine to define the slope of the leading edge while measurement points 74 and 75 combine to define the trailing pulse slope. Interpolating between the slope indicating points (70,71 or 74,75) locates the time at which the 50% threshold 66 amplitude is exceeded. The 50% threshold 66 value is calculated by halving the sum of the values indicated as the baseline level at 69 or 76 plus the PWM amplitude value indicated by points 72 or 73. The elapsed time between the leading and trailing edges 70–71 and 74–75 at threshold line 66 indicates pulse length. Increasing the peak amplitude of the pulse as shown by pulse 68 results in a greater length pulse measured by the respective times that PWM threshold 79 is crossed by read-back PWM signal 67, as can be easily seen in FIG. 7. At the trailing edge, numerals 77 and 78 indicate the increase in pulse duration or length as caused by increased pulse peak amplitude.

Before using the recorder, such as during manufacture or before, these PWM pulse durations are calibrated to an empirically determined optimal laser power level for enabling calculating relative laser power level used to create the recorded pulse. For example, a first WORM disk may require eleven milliwatts for optimal recording. A PWM pulse 68 recorded at ten milliwatts on this first disk results in a recorded PWM signal that is too short. If the pulse width to relative power is calibrated, it than can be calculated by the time measure that such PWM pulse was in recorded at about 10% below optimal power level. Conversely, if the recorded PWM signal is too long, that indicates the optimal power level is lower. This measurement is used for each individual disk for obtaining optical recording on each and every disk. This principle is used in the present invention. Measuring the duration or length of the read back write-pulse-generated PWM laser test signal yields the relative laser beam power level that recorded the pulse (same in-focus condition).

Accordingly, during a first data write operation (write command execution) during any recording session on a write-once disk or upon detecting a write error, the ALPC field 32 recorded laser test signal 42 is measured, as seen in FIG. 7. Then microprocessor 10, using a table lookup generated as set forth above and stored in microprocessor 10, calculates a recording power level used to record laser test signal. To practice the present invention, quantitative analysis of the write-pulse-generated PWM signal is not required. A desired length for the write-pulse-generated PWM signal is predetermined and stored in an internal memory of microprocessor 10. If a measured length of the write-pulse-generated PWM signal is greater than the desired length, then laser power is decreased. If a measured length of the write-pulse-generated PWM signal is less than the desired length, then laser power is increased. The latter process is preferably iterative as will become apparent.

Figure 8:
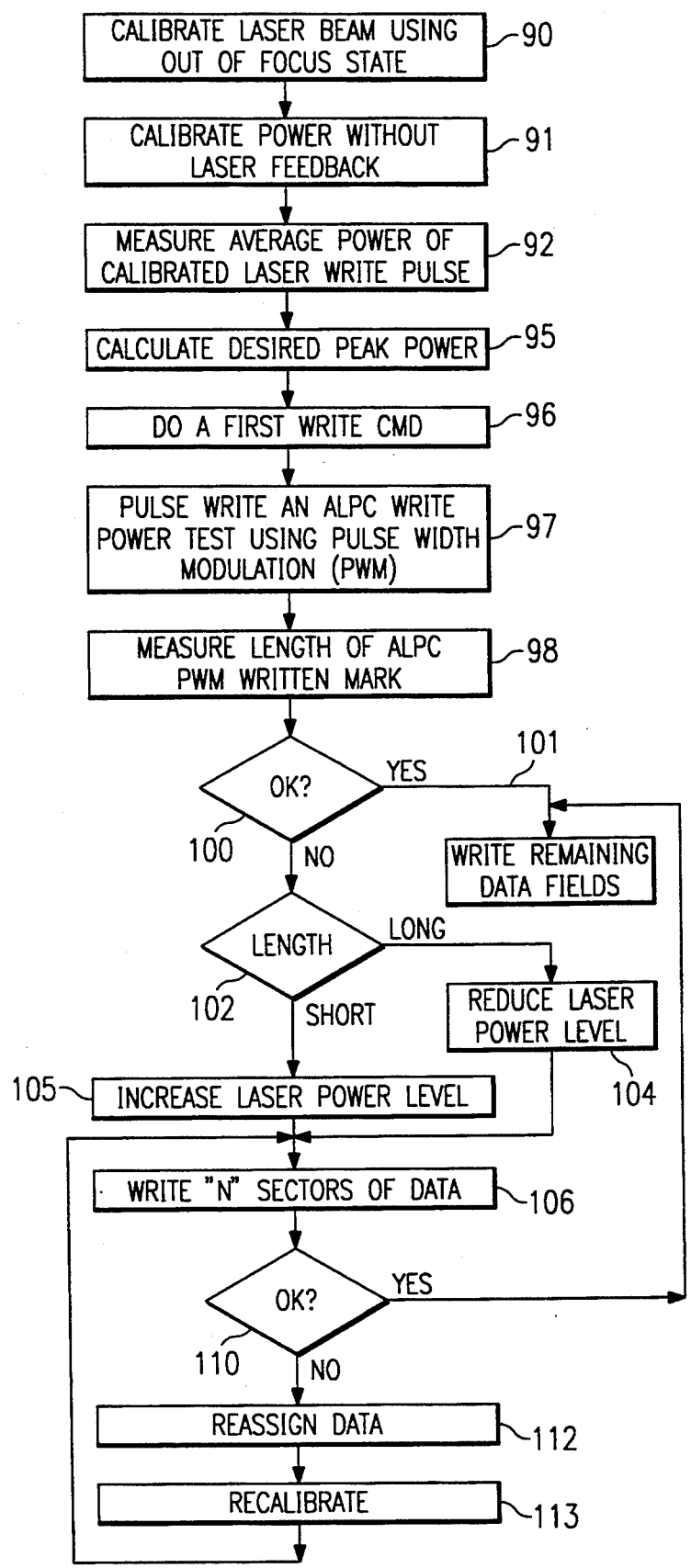
FIG. 8 is a simplified machine operations chart illustrating practicing the present invention in the FIG. 1 illustrated apparatus.

FIG. 8 illustrates one embodiment of the present invention. This embodiment includes a program embedded in microprocessor 10. Therefore, the machine operations chart represent the embedded program means that may be implement using any known programming technique. Steps 90–95 effect initialization of laser 14 operation. Call et al U.S. patent illustrates initialization of a laser in an optical recorder after an optical disk has been received by the illustrated optical disk recorder. In the illustrated embodiment, step 90 calibrates laser 14 write beam power level using an out-of-focus laser beam (see line 46 of the graph shown in FIG. 4). The laser 14 is preferably calibrated without using feedback via power detect 28 (FIG. 1) as indicated in step 91. Step 92 measures the average power of calibrating laser write pulse for setting laser 14 drive current level, as is known. In the illustrated embodiment a 3T test pattern was used. This pattern is a series of pulses (1's) separated a number of bit recording positions indicated by a number of vacant (no-pulse) bit positions (0's), such as 100010001 . . . . The usual recorded desired write beam power level on each optical disk 22 is used in this calibration. As pointed out above, such a calibration may not be optimum nor suitable for a given recording operation. In accordance with this invention, the laser 14 power level is automatically adjusted by measuring the duration or length of the write-pulse-generated PWM signal.

Each time the FIG. 1 recorder is powered on, steps 90–95 are performed. Such powering on starts a recording session. No further action is taken until data are received for recording on disk 20, such as at step 96. The description assumes that the optics 15 are relatively positioned to disk 15 for accessing a target sector. In a first pass over the sector, step 97 records a write-pulse-generated PWM laser test signal in ALPC field 32 using the steps 90–95 calibrated beam power level. This recorded laser test signal is preferably not more than one byte in duration, i.e. is less than the 2-byte length of ALPC field 32. In a second pass over the sector, step 98 measures the recorded pulse duration as best seen in FIG. 7. Since automatic linear interpolation to find a threshold crossing is known, it is not further detailed herein.

After the measurement, microprocessor 10 in step 100 compares the measured length of the read back write-pulse-generated PWM laser test signal with a desired length. If the comparison shows that the measured length is within an empirically determined length tolerance of the desired length (step 10 OK exit YES), then data are written in the target and other sectors as indicated by numeral 101.

If the step 100 comparison shows the measured length to be outside the predetermined tolerance (step 100 "NO" exit), then step 102 determines whether the measured test signal length is longer or shorter than the desired laser test signal length. Step 104 reduces laser drive current amplitude for a too-long measured write-pulse-generated PWM signal while step 105 increases laser drive current amplitude for a too-short measured write-pulse-generated PWM signal. The reduction or increase in laser drive current amplitude can be a constant amount fixed in the recorder design, or since the slope indicated by line 60 (FIG. 6) is known, that slope determines the estimate for amount of change in drive current amplitude, i.e. the drive current amplitude change should change the laser beam power by an amount not greater than, preferably equal to, the difference between measured power level (measured pulse length) and desired power level. Further, small adjustments in laser drive current can include compensations for radial position of the beam on disk 20. The laser drive current amplitude adjustment is completed by microprocessor 10 changing the digital input to laser drive DAC 25.

From step 104 or 105, machine operations proceed to step 106 for writing "N" sectors of data, including the original target sector, all in a second pass. N is a positive integer, as 3, 5, 8, 10, etc. This writing is done at the adjusted drive current level. That is step 104 or 105 are completed for laser drive write current amplitude change between the trailing edge of the ALPC field 32 write-pulse-generated PWM signal and the onset of recording. An alternative is to write the target sector at the original laser drive current value, then perform step 106 on an additional N sectors. If optics 15 include read-while-write or read-after-write capabilities, then the above described measurement operations occur in but one pass over the target sector.

Step 110 during a next pass over the sectors during a verify operation, measures the lengths of all the ALPC field 32 read back and just-recorded write-pulse-generated PWM laser test signals. Alternately, step 110 can measure, in addition to or in replacement of, the lengths of PWM pulse marks or signals recorded in data area 33 to the PWM signal recorded in the ALPC areas 32. The measured PWM signal lengths are averaged to produce an average measured PWM signal length. The averaged measured PWM signal length is then compared with the desired or optimal PWM signal length. If the averaged measured length is within a predetermined tolerance, then recording continues at arrow 101 using the just adjusted write drive current amplitudes. If step 110 finds the averaged measured length to be out of tolerance with the desired length, then step 112 reassigns data recorded in all of the N sectors for recording in alternate sectors. Such reassignment and recording is well known. After the reassignment but before the recording in the alternate sectors, steps 97–105 are repeated in step 113. Then the N sectors of data are written to the alternate sectors. The number of cycles of steps 106–113 may be limited to a fixed number of iterations, such as three.

While the invention has been particularly shown and described with reference to preferred embodiments thereof, it will be understood by those skilled in the art that various changes in form and details may be made therein without departing from the spirit and scope of the invention.

What is claimed is:

1. A method of controlling laser power levels in a write-once optical recorder, laser means for emitting a laser beam to a write-once optical disk for recording data thereon in a track of said disk, said recorder having a microprocessor controller, means optically-coupled to the laser means for detecting and indicating laser power level of said emitted laser beam, said optical disk having a multiplicity of addressable write-once sectors disposed in said track, some of said sectors respectively having predetermined unwritten areas that can be written to without overwriting any recorded data or signals;

the improvement including machine-executed steps of:

initializing said laser means to emit said laser beam at a predetermined write power level;

selecting a first one of said sectors having one of said unwritten areas;

accessing said first sector for recording a predetermined laser test signal in said unwritten area of said first sector as a recorded laser test signal;

after recording-said laser test signal, reading said recorded laser test signal, then examining said read recorded laser test signal for deriving from said read recorded laser test signal a predetermined indication of said predetermined write power level;

establishing a desired laser test signal a desired indication of for indicating a desired laser write power level; and comparing said predetermined indication with said desired indication for indicating whether the recorded laser test signal predetermined indication substantially equals or is greater or less than said desired indication, if said comparison shows said substantial equality, then proceeding to record data, otherwise, adjusting the laser write power level by reducing the laser write power level from an over power level indicated by said predetermined indication being greater or less than said desired indication laser test signal length for increasing or decreasing, respectively, said laser write power level.

2. In the method set forth in claim 1, further including steps:

establishing write pulses to record data in said sectors;

generating a series of overlapping one of said write pulses;

recording said series of overlapping write pulses in said first sector as said laser test signal.

3. In the method set forth in claim 1 further including steps of:

establishing a laser power level check area in each of said addressable sectors; and selecting said check area to be said unwritten area of said first sector.

4. In the method set forth in claim 3, further including steps of:

establishing in each of said addressable sectors a data area for receiving and storing data;

after said adjusting step, recording data in "N" of said data areas of respective ones of said addressable sectors having unwritten ones of said data areas, N being a positive integer;

before recording data in each of said N sectors, recording a PWM signal in the respective checking areas of said N sectors;

measuring recorded lengths of said PWM signals recorded in said N sectors;

averaging the measured N sector recorded laser test signal lengths to produce an average laser test signal length; and repeating said comparing and adjusting steps.

5. In the method set forth in claim 3, further including steps of:

in said accessing step, recording said laser test signal in said checking area of said first sector as a series of overlapping write pulses so as to overlap along the length of said track at said predetermined write power level for recording a pulse-width-modulated (PWM) test signal as said laser test signal.

6. In the method set forth in claim 3, further including steps of:

before performing said accessing step, creating said checking area to have a length for storing a predetermined number of data bytes; and in said accessing step, recording said PWM laser test signal to have a length substantially less than said predetermined number of bytes.

7. In the method set forth in claim 3, further including steps of:

in said controller, supplying a laser drive current to the laser for actuating the laser to emit a laser beam having said predetermined laser power level; and in said adjusting step, changing said laser drive current for changing said laser power level from said predetermined laser power level.

8. In the method set forth in claim 1, further including steps of:

establishing in each of said addressable sectors a laser check area and a data storing area, unrecorded ones of said laser check area and said data storing area in each of said sectors respectively being two of said predetermined unwritten areas;

in said accessing step, recording the laser test signal in said laser check area;

after said adjusting step, recording data in first predetermined ones of said sectors having unrecorded data areas;

after said adjusting step, recording said laser test signal in second predetermined ones of said sectors having unrecorded data areas and recording said laser test signal in each of said laser check areas in said second predetermined ones of said sectors; and reading all of the recording laser test signals from said second predetermined ones of said sectors, measuring the lengths of each said laser test signal read from said second predetermined ones of said sectors, averaging the read values, then repeating said comparing step.

9. In apparatus for controlling laser emitted beam power levels in an optical write-once optical disk recorder, a laser for emitting a laser beam via an optical path means to a recording track on a write-once optical disk, power level sensing means optically coupled to the optical path means for receiving a portion of said emitted laser beam and connected to a controller for indicating to the controller a measured optical beam power level, including, in combination:

initializing means in said controller for initializing said laser means to emit said laser beam at a predetermined write power level;

sector selecting means in the for selecting a first one of said sectors having a first unwritten area;

accessing means in said controller for accessing said first unwritten area of said first one sector;

write means connected to the optical path means for recording a predetermined laser test signal in said first unwritten area as a recorded laser test signal;

read back means in said controller and connected to the optical path means and being responsive to said controller actuating said recording means for recording said laser test signal for sensing said recorded laser test signal to supply said sensed recorded laser test signal to said controller;

examining means in said controller for receiving said sensed recorded laser test signal for examining said sensed recorded laser test signal for generating a predetermined indicating signal indicting a recording laser power level for said sensed recorded laser test signal;

reference means in said controller for establishing a desired laser test signal recorded power level and for generating a desired indicating signal of said desired laser test signal recorded power level corresponding to a desired laser write power level;

comparator means in said controller and connected to said reference means and to said measuring means for receiving said desired laser test signal indicating signal and said predetermined indicating signal for comparing said predetermined indicating signal with said desired indicating signal for indicating whether said predetermined indicating signal substantially equals or is greater or less than said desired indicating signal, recording approval means connected to said comparator means and to said controller for being responsive to said comparator means indicating that said comparison shows said substantial equality for sending a proceed to record control message to the controller, and adjusting means connected to the comparator and to the controller for responding to the comparator indicating that predetermined indicating signal is greater than said desired indicating signal for reducing the laser write power level and further responsive to said comparator indicating that the predetermined indicating signal is less than said desired indicating signal for increasing laser write power level.

10. The apparatus set forth in claim 9, further including, in combination:

said write means including means for generating a write pulse, said write means including means for generating a series of a predetermined number of said write pulses that overlap for generating a PWM signal as said laser test signal.

11. The apparatus set forth in claim 9, further including, in combination:

said first unwritten area being a laser checking area;

cycling means connected to said recording means and to said adjusting means for responding to one of said laser power level adjustments for recording predetermined data in "N" unwritten sectors using said adjusted laser power level, N being a positive integer;

said recording means before recording data in each of said N sectors, recording said laser test signal in each of the respective checking areas of said N sectors as N sector recorded laser test signals;

said read back means sensing all of said N sector recorded laser test signals and supplying the sensed N sector recorded laser test signals to said measuring means and averaging means in said measuring means, said measuring means measuring and indicating lengths of each of said sensed N sector recorded laser test signals and supplying said measured length indications to said averaging means, said averaging means deriving an average measured length signal from all of said sensed N sector recorded laser test signals for supplying said average measured length signal to said comparator means as said measured length indication.

12. The apparatus set forth in claim 11, further including, in combination:

said recording means having timing means for measuring predetermined bit periods on said track to actuate the laser at the expiration of binary 1 indicating ones of said predetermined bit periods to actuate said laser to emit a binary one indicating impulse of light energy to said track for recording a one-indicating signal in said track;

test signal control means in said recording means responsive to said controller indicating that said laser test signal is to be recorded in said checking area to actuate the timing means to reduce said predetermined bit periods to have a predetermined shorter duration such that recorded one bit indicating signals on said track overlay longitudinally of said track and for recording a predetermined series of one indicating signals as said laser test signal.

13. The apparatus set forth in claim 12, further including, in combination:

byte determining means in said timing means for indicating that M of said bit periods are a byte length, where M is a positive integer;

said checking area in each of said sectors having a length of KM bytes, wherein K is a positive integer; and laser test signal length means connected to said controller and to said byte determining means and to said recording means for responding to byte determining means and to said controller for supplying a control signal to said recording means for indicating said laser test signal to be recorded as J of said successive ones of said one-indicating signals wherein J is less than KM.

14. Apparatus set forth in claim 9, further including, in combination:

said examining means having means for measuring a length of said sensed recorded laser test signal and generating a length indication as said predetermined indication of said sensed recorded laser test signal; and said reference means having means for establishing a desired laser-test-signal length indicating signal as said desired indicating signal.

15. The method forth in claim 1, including steps:

in said examining step, measuring a length of said recorded laser test signal and generating a length indication as said predetermined indication; and in said establishing step, indicating a desired length of a recorded laser test signal as said desired indication.

* * * * *